US010095640B2

(12) United States Patent
Dumoulin (10) Patent No.: US 10,095,640 B2
(45) Date of Patent: Oct. 9, 2018

(54) MULTI MODE ADDRESS SPACES FOR PC TO DEVICE TRANSFER OPTIMIZATION

(71) Applicant: Synopsys, Inc., Mountain View, CA (US)

(72) Inventor: Frédéric Dumoulin, Magny les Hameaux (FR)

(73) Assignee: SYNOPSYS, INC., Mountain View, CA (US)

( * ) Notice: Subject to any disclaimer, the term of this patent is extended or adjusted under 35 U.S.C. 154(b) by 397 days.

(21) Appl. No.: 14/632,284

(22) Filed: Feb. 26, 2015

(65) Prior Publication Data

US 2015/0248363 A1    Sep. 3, 2015

(30) Foreign Application Priority Data

Mar. 3, 2014   (EP) ..................................... 14157458

(51) Int. Cl.
  *G06F 13/00*   (2006.01)
  *G06F 13/28*   (2006.01)
  *G06F 12/06*   (2006.01)
(52) U.S. Cl.
  CPC .......... *G06F 13/28* (2013.01); *G06F 12/0615* (2013.01); *G06F 2212/657* (2013.01)

(58) Field of Classification Search
  CPC ............................ G06F 12/0615; G06F 13/28
  See application file for complete search history.

(56) References Cited

U.S. PATENT DOCUMENTS

| 6,438,628 B1 | 8/2002 | Messerly et al. |
| 6,904,473 B1 | 6/2005 | Bloxham et al. |
| 7,340,705 B1 * | 3/2008 | Massabki ............ G06F 17/5027 716/111 |
| 2011/0138221 A1 * | 6/2011 | Hanaoka ............ G06F 11/1441 714/6.1 |
| 2015/0058596 A1 * | 2/2015 | King ................... G06F 12/1081 711/206 |

OTHER PUBLICATIONS

EPO Application No. EP 14157458.2, Supplementary European Search Report and European Search Opinion, dated Sep. 9, 2014

* cited by examiner

*Primary Examiner* — Zachary K Huson
(74) *Attorney, Agent, or Firm* — Alston & Bird LLP (57) ABSTRACT

A computer-implemented method for transferring data over a bus from a host to a device is presented. The method includes determining a size of the data to be transferred, transferring the data using normal mode when the size is below a threshold, and transferring the data using burst mode when the size is equal to or larger than the threshold.

15 Claims, 5 Drawing Sheets

MULTI MODE ADDRESS SPACES FOR PC TO DEVICE TRANSFER OPTIMIZATION

CROSS-REFERENCE TO RELATED APPLICATIONS

This application claims priority, under 35 U.S.C. § 119 (a-d), from European Patent Application No. 14157458.2, filed on Mar. 3, 2014, entitled "MULTI MODE ADDRESS SPACES FOR PC TO DEVICE TRANSFER OPTIMIZATION," the contents of which is incorporated herein by reference in its entirety.

BACKGROUND

The present invention relates to electronic data transfer, and more particularly, to a method and system for transferring data over a bus from a host computer to an electronic device.

Various types of high speed expansion bus standards such as the peripheral component interconnect express (PCIe) bus standard and hardware compliant therewith have been used to transfer data from a system bus on a host computer such as a personal computer (PC) or server motherboard, hereinafter also referred to as a "host", to another device not on the system bus, hereinafter also referred to as a "resource", such as for example a circuit emulator. Such data transfer from a host to another device over an expansion bus may be called a "slave access". The device may or may not reside directly on a board compliant with or supporting the PCIe bus standard, hereinafter also referred to as a PCIe board. However, it is understood the device may be in communication with the PCIe board via the PCIe board's local bus.

There are several ways to send data from a host to a PCIe board, among others these ways may be bus mode and direct memory access (DMA) mode. In bus mode, an address pointer running in software on the host may be remapped on the PCIe board's address space. Then, the data to be transferred may be sent directly from the PC memory to the PCIe board. Then, the PCIe board may write the data into the device or resource at the address corresponding to the offset of the pointer. Bus mode may have an advantage because the data transfer ends as soon as the software finishes copying and the PCIe board writes data immediately on the local bus, there is little if any latency delay. However, bus mode may have the disadvantage of low bandwidth because the accesses to the PCIe bus may be made only 32-bit word by 32-bit word by sending the address and the data in associated pairs for each data word to be sent. Thus, the ratio between the number of useful data words, N, and the total number of words sent is N/(2×N), which results in low bandwidth.

In DMA mode, a DMA controller either at the operating system level or from the PCIe board may be used. In this case, the software running on the host performs the following activities. First, the software copies the data to be transferred into a memory area readable by the PCIe board. Then the software may initialize the PCIe board DMA controller with; i) the address of the memory area where data will be read, ii) the address of the resource where the data will be written via the local bus, iii) the number of data words to write, and iv) the transfer start command. Then the software may poll a transfer completion flag to ensure that the data transfer is completed since the data transfer may be done in background operation. When the DMA controller receives the transfer start order, the DMA controller may; v) read the data in the memory of the host, vi) write data to the address specified by the software resource, and vii) update the transfer completion flag.

Because of the multitude of initializations that the software must do and the host memory the DMA controller must read, the DMA mode may be more complex and have increase latency between the notification to start data transfer and the start of data transfer than in bus mode. However, the DMA controller may read the data in the host memory block by block with only one address for N data words, hereinafter also referred to as a "burst". The ratio between the number of useful data words transferred and the total number of words sent is N/(1+N). Thus, the bandwidth may be significantly better than in the bus mode particularly when a large number of words is sent.

Accordingly, there is a need to improve the speed of data transfer over a bus without the complexity and initialization latency of DMA mode and without the low bandwidth speed of bus mode while still preserving the high bandwidth speed of DMA mode and the low initialization latency of bus mode.

SUMMARY

According to one embodiment of the present invention, a computer-implemented method for transferring data over a bus from a host to a device is presented. The method includes determining a size of the data to be transferred, transferring the data using normal mode when the size is below a threshold, and transferring the data using burst mode when the size is equal to or larger than the threshold.

According to one embodiment, the bus is a peripheral component interconnect express (PCIe) bus. According to one embodiment, transferring the data using burst mode does not use a direct memory access (DMA)-able memory.

According to one embodiment, the method further includes transferring the data to a first address space when the size is below a threshold, and transferring the data to a second address space different from the first address space when the size is equal to or larger than the threshold. According to one embodiment, the first address space and the second address space are included in an address space of the device. According to one embodiment, transferring the data to the first address space uses a first address pointer and transferring the data to the second address space uses a second address pointer different from the first address pointer.

According to one embodiment, the device is a circuit emulator. According to one embodiment, the circuit emulator includes at least one field programmable gate array (FPGA).

According to one embodiment, the data includes one or more words, each word including a multitude of data bits capable of being concurrently transferred on the bus. According to one embodiment, the size is a value corresponding to the number of the one or more words being transferred. According to one embodiment, transferring the data using normal mode includes transferring one or more addresses each associated with a different one of the one or more words forming one or more address/data pairs, the one or more address/data pairs being sequentially transmitted. According to one embodiment, the threshold is selected at a value of size corresponding to an inflection point above which transferring the data using burst mode provides a steeper slope than below the inflection point on a plot of bandwidth versus size.

According to one embodiment, transferring the data using burst mode includes transferring a first address associated with a multitude of words and sequentially transferring the multitude of words. According to one embodiment, transferring the data using burst mode includes transferring a second address different from an address expected for the next sequential address after sequentially transferring the multitude of words to signify an end of transferring the data using burst mode.

According to one embodiment of the present invention, a non-transitory computer-readable storage medium comprising instructions which when executed by a computer cause the computer to determine a size of the data to be transferred, transfer the data using normal mode when the size is below a threshold, and transfer the data using burst mode when the size is equal to or larger than the threshold. According to one embodiment, the non-transitory computer-readable storage medium further causes the computer to transfer the data to a first address space when the size is below a threshold, and transfer the data to a second address space different from the first address space when the size is equal to or larger than the threshold.

According to one embodiment of the present invention, a system for transferring data over a bus from a host to a device configured to determine a size of the data to be transferred, transfer the data using normal mode when the size is below a threshold, and transfer the data using burst mode when the size is equal to or larger than the threshold. According to one embodiment, the system is further configured to transfer the data to a first address space when the size is below a threshold, and transfer the data to a second address space different from the first address space when the size is equal to or larger than the threshold.

A better understanding of the nature and advantages of the embodiments of the present invention may be gained with reference to the following detailed description and the accompanying drawings.

DETAILED DESCRIPTION

According to one embodiment of the present invention, a computer-implemented method for transferring data over a bus from a host to a device is presented. The method includes determining a size of the data to be transferred, transferring the data using normal mode when the size is below a threshold, and transferring the data using burst mode when the size is equal to or larger than the threshold.

Figure 1A:
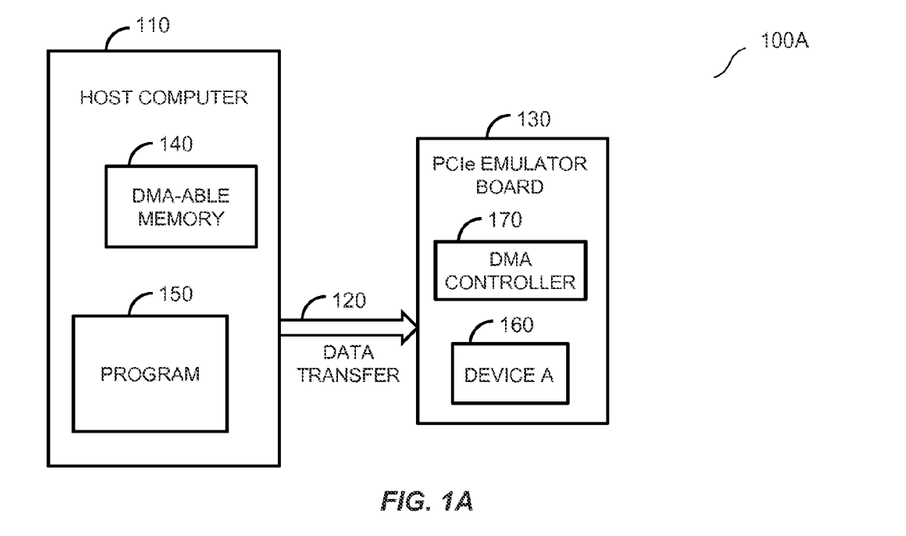
FIG. 1A depicts a simplified exemplary block diagram for a system adapted to transfer data over a bus from a host computer to a device on a PCIe board, in accordance with one embodiment of the present invention.

FIG. 1A depicts a simplified exemplary block diagram for a system 100A adapted to transfer data over a bus 120 from a host computer 110 to a device 160 on a PCIe board 130, in accordance with one embodiment of the present invention. Host computer 110 may include a program 150, which when run on the computer may in part execute embodiments of the present invention. In one embodiment, bus 120 may be a PCIe bus. In one embodiment, the data transfer does not use a DMA-able memory 140 on host 110. In one embodiment, the data transfer does not use a DMA controller 170 on PCIe board 130. In one embodiment, PCIe board 130 may be a circuit emulator, which may include field programmable gate arrays.

Figure 1B:
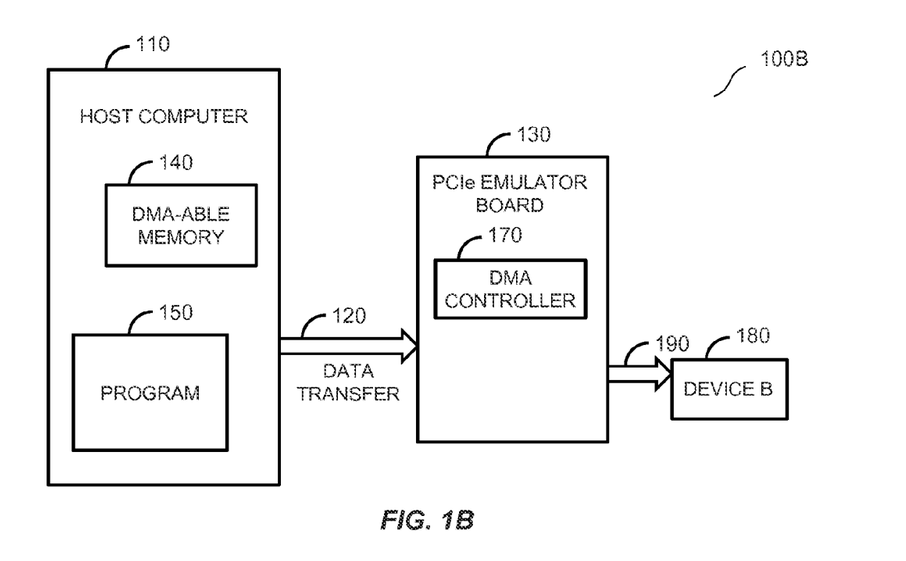
FIG. 1B depicts a simplified exemplary block diagram for a system adapted to transfer data over a bus from a host computer to a device coupled to a PCIe board via a local bus, in accordance with one embodiment of the present invention.

FIG. 1B depicts a simplified exemplary block diagram for a system 100B adapted to transfer data over bus 120 from host computer 110 to a device 180 coupled to PCIe board 130 via a local bus 190, in accordance with one embodiment of the present invention. In other words, system 100B is similar to system 100A depicted in FIG. 1A except device 180 may not reside directly on PCIe board 130 but may be connected to PCIe board 130 via local bus 190.

Figure 2:
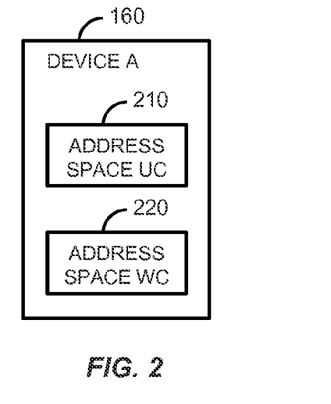
FIG. 2 depicts a simplified exemplary block diagram for the device depicted in FIG. 1A, in accordance with one embodiment of the present invention.

FIG. 2 depicts a simplified exemplary block diagram for device 160 depicted in FIG. 1A, in accordance with one embodiment of the present invention. The address space of device 160 may be associated or include two address spaces, an address space UC 210 and an address space WC 220. It is understood that device 180 depicted in FIG. 1B may be similar to device 160 depicted in FIG. 1A.

Figure 3:
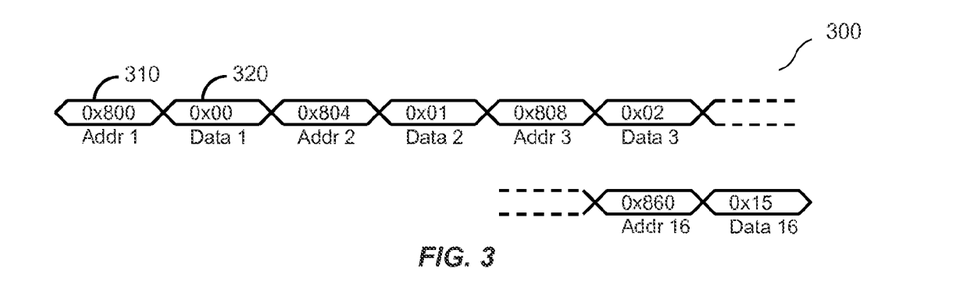
FIG. 3 depicts a simplified exemplary timing diagram for normal mode data transfer, in accordance with one embodiment of the present invention.

FIG. 3 depicts a simplified exemplary timing diagram 300 for normal mode data transfer, hereinafter also referred to as a normal mode "packet" 300, in accordance with one embodiment of the present invention. The useful data being transferred from the host to the device includes one or more words 320, each word including a plurality of data bits (not shown) capable of being concurrently transferred on bus 120 depicted in FIG. 1A and FIG. 1B. For PCIe board 130 each word may be 32 bits, or in other words, bus 120 may be 32 bits wide. Normal mode packet 300 depicted in FIG. 3 transfers the data using normal mode data writing, which includes transferring one or more addresses 310 each associated with a different one of the one or more words 320 forming one or more address/data pairs, the one or more address/data pairs being sequentially transmitted. For example, Addr 1 may be paired with Data 1, Addr 2 may be paired with Data 2, and so on until the end of the data packet where Addr 16 may be paired with Data 16. In this example, the length or size of normal mode packet 300 is 16 data words and 16 addresses. Each data word may be preceded by the destination address for that associated data word. Normal mode packet 300 may be an example of bus-mode data-transfer resulting in half the packet being address information and thus reducing bandwidth especially for large size data transfers.

Figure 4:
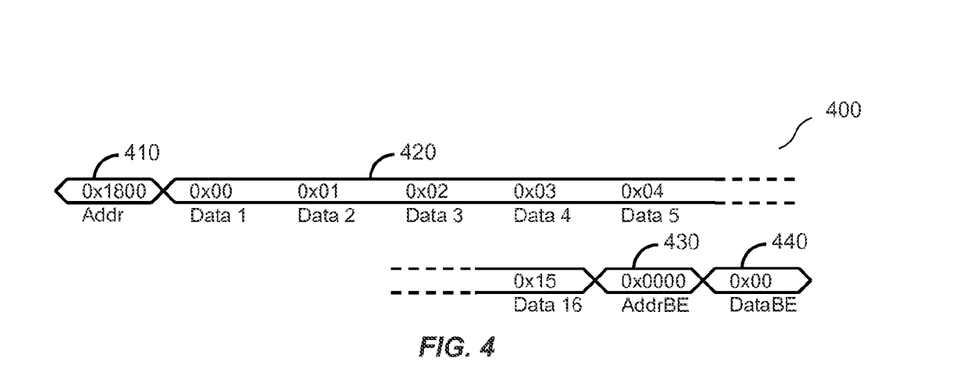
FIG. 4 depicts a simplified exemplary timing diagram for burst-mode data transfer, in accordance with one embodiment of the present invention.

FIG. 4 depicts a simplified exemplary timing diagram 400 for burst mode data transfer, hereinafter also referred to as a burst mode "packet" 400, in accordance with one embodiment of the present invention. Burst mode packet 400 transfers the data using burst-mode data writing, which includes transferring a first address Addr 410 associated with a multitude of words 420 and sequentially transferring multitude of words 420. For example, Addr 410 may precede a sequential multitude or burst of data words, Data 1, Data 2, Data 3, and so on until the end of the data burst at Data 16.

In one embodiment, transferring the data using burst mode includes transferring a second burst-end address AddrBE 430 different from an address expected for the next sequential address after sequentially transferring multitude of words 420 to signify an end of transferring the data in burst mode. In this example, the starting address, Addr 410 may be specified as 0x1800 (addresses specified in hexadecimal base notation) and the number of data words is 16 so the address where Data 16 will go is 0x183C because it takes 4 addresses×8 bits per memory address to fit the 32 bits per transferred per data word. The next consecutive address after the burst ending at 0x183C would thus normally be 0x1840. Thus, by following the burst with any address different from the expected next address, 0x1840, will inform the system that the burst is ended. In this example, the address specified for AddrBE 430 is specified as 0x0000, which is clearly different from 0x1840. A superfluous data word DataBE 440 specified arbitrarily as 0x00 follows AddrBE 430 to maintain write command consistency.

In this example, the length or size of burst mode packet 400 is 16 data words plus one address plus one burst-end address plus one burst-end data. Each burst of data words may be preceded by the destination address for that associated data word. Burst mode packet 400 may be similar to DMA mode data transfer resulting in high bandwidth especially for large size data transfers. However, as will be described below, changing the attributes of the PCIe address space improves performance by enabling bursts to be generated during the bus mode, but avoiding the latency and complexity of DMA mode. In other words, transferring the data using burst mode does not use direct memory access (DMA)-able memory 140 depicted in FIG. 1A and FIG. 1B.

Figure 5:
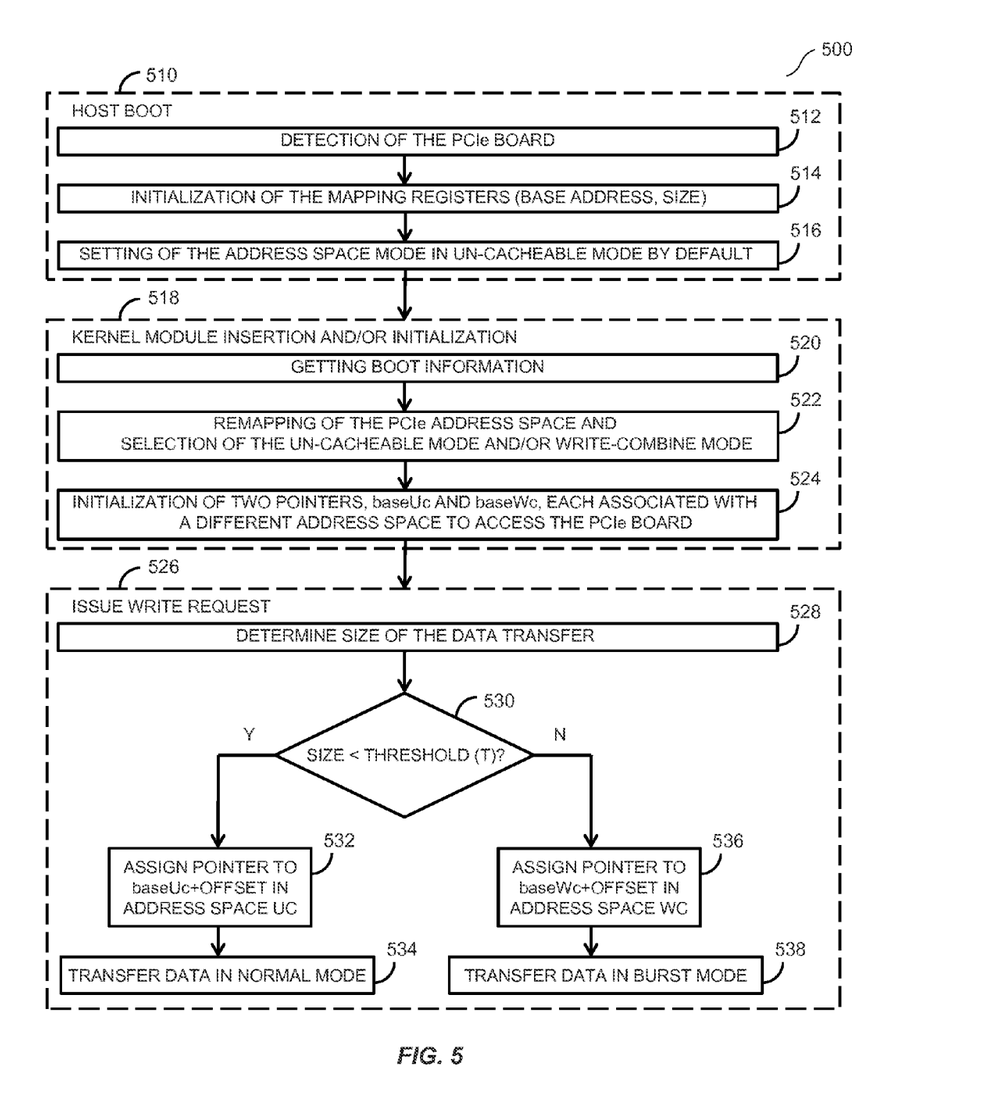
FIG. 5 depicts a simplified exemplary flow chart for transferring data over a bus from a host to a device, in accordance with one embodiment of the present invention.

FIG. 5 depicts a simplified exemplary flow chart 500 for transferring data over bus 120 from host 110 to device 160 or device 180 as depicted respectively in FIG. 1A and FIG. 1B, in accordance with one embodiment of the present invention. Referring to FIG. 5, flow chart 500 shows how to establish the connection with the PCIe board. Flow chart 500 includes host boot 510, which in-turn includes detection 512 of the PCIe board, initialization 514 of the address mapping registers such as base address and size. By default, the PCIe address space initialized during the remapping phase is designated not to use the cache, i.e. marked or set 516 to UnCacheable (UC) mode, herein also referred to as "normal mode", for Intel manufactured processors.

By changing the attributes of the address space, successive address writes may be forced to be gathered into a single transfer using a WriteCombine (WC) mode for Intel manufactured processors, so bursts may be generated in bus mode without having the initialization latencies caused by using the DMA-able memory or the DMA controller. Write-Combine mode is described in a Intel white paper by Liang-min Wang titled "How to Implement a 64B PCIe* Burst Transfer on Intel® Architecture" published February 2013 and available at the following web site; http://www.intel.com/content/dam/www/public/us/en/documents/white-papers/pcie-burst-transfer-paper.pdf, the contents of which is incorporated by reference in its entirety.

On Intel-compatible processors, changing the attributes of the PCIe address space may be done by programming two types of registers in the processor: a memory type range register (MTRR), or a page attribute table (PAT). Although performances may be similar with either MTRR or PAT modification, modifying the PAT will be described herein because modifying the PAT is simpler than modifying the MTRR. Details for both MTRR and PAT modification are available from the "Intel® 64 and IA-32 Architectures Software Developer's Manual", Volume 3A, referring to chapter 11.11 for MTRR modification and chapter 11.12 for PAT modification and available at the following web site; http://www.intel.fr/content/dam/www/public/us/en/documents/manuals/64-ia-32-architectures-software-developer-manual-325462.pdf, the contents of which is incorporated by reference in its entirety.

Attribute programming of the address space may be done from the kernel module that manages the PCIe board during kernel module insertion and/or initialization 518, which includes getting 520 boot information, and then remapping 522 of the PCIe address space and selection of the un-cacheable mode and/or write-combine mode.

For a host computer running with a LINUX operating system, one may refer to the following three documents that describe the programming interface. "MTRR (Memory Type Range Register) control" dated 3 Jun. 1999 by Richard Gooch" and available at the web site https://www.kernel.org/doc/Documentation/x86/mtrr.txt, the following untitled and undated document available at the web site https://www.kernel.org/doc/Documentation/x86/pat.txt (only for kernel versions higher than 2.6.2), and "Linux Device Drivers" dated Jan. 21, 2005, third edition, chapter 12 available at the web site http://lwn.net/images/pdf/LDD3/ch12.pdf, the contents of all of which are incorporated by reference in their entirety.

Performances may be improved by using WriteCombine mode marked memory areas thanks to the characteristics of burst mode transmission described above. But burst mode transmission may still have two drawbacks; i) sending data may be delayed, so there may be a small latency associated with defining the end of the burst or the burst length, and ii) data may not be ordered when arriving at the device or destination resource. In one embodiment, writing the appended AddrBE 430 and DataBE 440 as described in reference to FIG. 4 at the end of the burst transfer may be used to break or end the burst and so determine a burst end, which limits the delay of sending the next data transmission and reduces the WriteCombine mode latency problem.

Accordingly, writing burst mode packet 400 starting with 1 address+N data increases by 1 address+1 data because of appending AddrBE 430 and DataBE 440, which has a minor impact on performance. Therefore, for burst mode packet 400 the resulting ratio between the number of useful words and the total number of words sent is N/(1+N+2), which is much better than in bus mode but only a little worse than in DMA mode. However using the burst mode packet 400 via the WriteCombine mode eliminates the initialization latency associated with DMA mode operation, thus improving overall bandwidth performance significantly as will be demonstrated below.

In one embodiment, the device or resource in which burst mode packet 400 may be written into should support the WriteCombine mode and processes burst mode packet 400 properly after arrival to avoid the not ordered data problem in WriteCombine mode. Therefore, an address space marked WriteCombine may be used when two conditions are met: i) sending AddrBE 430 and DataBE 440 is not penalizing to bandwidth, and ii) the accessed resource supports not ordered data. Sending AddrBE 430 and DataBE 440 may not be penalizing according to N/(1+N+2) when N is larger than an empirically determined threshold, T described below. When the two conditions for using WriteCombine with burst mode packet 400 are not met, then a second address space marked UnCacheable may instead be used.

Referring simultaneously to FIG. 2 and FIG. 5 in one embodiment, when the memory address decoding in device 160 permits, i.e. the memory address space for device 160 is large enough, the PCIe address space associated with device 160 may be remapped 522 into multiple address spaces including address space UC 210 and address space WC 220, which is different from address space UC 210, each address space selected to be written to using a different one of the multitude of write modes. Remapping PCIe address space includes providing one or more parts or portions of the PCIe address space, such as address space UC 210, which may be designated to be accessed using UnCacheable mode for accesses not supporting the two WriteCombine constraints. Remapping of the PCIe address space further includes providing one or more parts of the PCIe address space, such as address space WC 220, which may be designated to be accessed using WriteCombine mode to take advantage of the bandwidth benefit of bursts described above. For example, a PCIe address space including 1FFF address locations in device 160 may be remapped such that the address space between address locations 0x0000 and 0x0FFF may be designated for UnCacheable mode use and the address space locations between 0x1000 and 0x1FFF may be designated for WriteCombine mode use.

The following example C-coding generates normal mode packet 300 referenced in FIG. 3 designated to be written into a portion of the PCIe address space between 0x0000 and 0x0FFF starting at Addr 1=0x800 using UnCacheable (UC) mode data transmission.

```
uint32_t *ptr = base + 0x0800 ;    // assign pointer on UC
address space starting at @ base
    for (int i = 0 ; i < 0x10 ; i++)
        ptr[i] = i ; use.
```

The following example C-coding generates burst mode packet 400 referenced in FIG. 4 designated to be written into a portion of the PCIe address space between 0x1000 and 0x1FFF starting at Addr=0x1800 using WriteCombine (WC) mode data transmission.

```
uint32_t *ptr = base + 0x1800 ;    // assign pointer on WC address
space starting at @ base + 0x1000
uint32_t *flush = base + 0x0000 ;  // assign pointer on UC address
space starting at @ base
    for (int i = 0 ; i < 0x10 ; i++)
        ptr[i] = i ;
    *flush = 0x00 ; transmission.
```

The uint32_t*flush=base+0x0000 through *flush=0x00 code above generates AddrBE 430 and DataBE 440 to designate the end or of burst transmission.

Referring simultaneously to FIG. 2 and FIG. 5 in one embodiment, kernel module insertion and/or initialization 518 may further include initializing 524 two different address pointers, baseUc and baseWc, each pointer associated with a different one of the multitude of address spaces to access device 160 on the PCIe board. For example, baseUc may be used during data writes using UnCacheable or normal mode data writing into address space UC 210 associated with device 160 and baseWc may be used during data writes using WriteCombine mode or burst mode data writing into address space WC 220. In other words, transferring the data to address space UC 210 uses address pointer baseUc and transferring the data to address space WC 220 uses address pointer baseWc, which is different from address pointer baseUc. DMA mode data transmission is not used since both baseUc and baseWc are used only in bus mode operation to avoid DMA initialization latency.

In one embodiment, after kernel module insertion and/or initialization 518 a write request may be issued 526 by the host computer. Issuing a write request 526 may include transferring the data to address space UC 210 when the size of the data is below threshold T, and transferring the data to address space WC 220 when the size is equal to or larger than the threshold T. In one embodiment, the size may be a value corresponding to the number of the one or more words being transferred. Thus, depending on the length or size of the data transfer to be made, the data transfer may be done through address space UC 210 using baseUc in the more flexible UnCacheable mode for short accesses or through address space WC 220 using baseWc in WriteCombine mode that improves bandwidth performance for longer, large sized data transfers.

Accordingly, issuing a write request 526 may further include determining 528 the size of the data and comparing 530 the size relative to threshold T. When the size is less than threshold T, the pointer may be assigned 532 to baseUc plus an offset in address space UC 210 and data may be transferred 534 or written to address space UC 210 using UnCacheable or normal mode. When the size is greater than or equal to threshold T, the pointer may be assigned 536 to baseWc plus an offset in address space WC 220 and data may be transferred 538 or written to address space WC 220 using WriteCombine or burst mode.

The following example C-coding uses two different pointers, baseUc and baseWc, each assigned to associated different address spaces on device 160 and selects which pointer may be used to access device 160 during the run session according to the size of the data transfer to be performed.

```
if (size < T)
{
    uint32_t *ptr = baseUc + 0x0800 ;   // assign pointer on UC address
space starting at @ baseUc
    for (int i = 0 ; i < size; i++)
        ptr[i] = i ;
}
else
{
    uint32_t *ptr = baseWc + 0x1800 ; // assign pointer on WC address
space starting at @ baseWc + 0x1000
    uint32_t *flush = baseUc + 0x0000 ;     // assign pointer on UC
address space starting at @ baseUc
    for (int i = 0 ; i < size; i++)
        ptr[i] = i ;
    *flush = 0x00 ;
}
```

Figure 6:
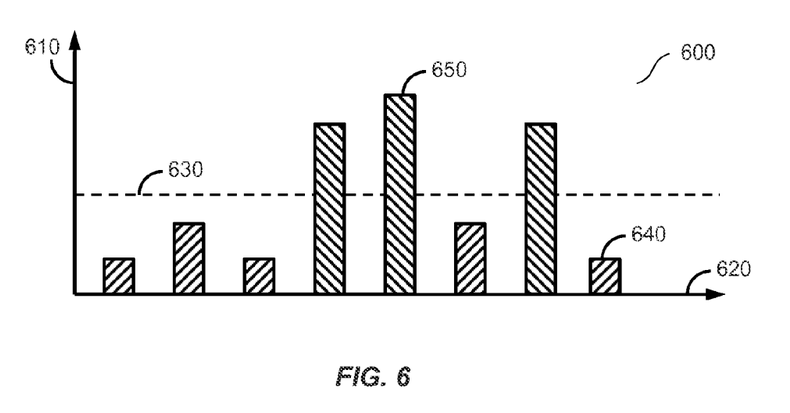
FIG. 6 depicts a simplified exemplary plot of size of data transfer versus multiple slave accesses because of using embodiments of the present invention.

FIG. 6 depicts a simplified exemplary plot 600 of size of data transfer versus multiple slave accesses because of using embodiments of the present invention. Plot 600 includes a vertical axis 610 depicting the size of data transfer and a horizontal axis 620 depicting multiple slave accesses to the device or resource. Plot 600 further includes a horizontal dashed line 630 depicting threshold T. Referring simultaneously to FIG. 2 FIG. 6, as a result of using embodiments of the present invention, multiple accesses having transfer size less than threshold T use normal mode operation 640 through address space UC 210, while multiple accesses having transfer size equal to or greater than threshold T use burst mode operation 650 through address space WC 220.

Figure 7:
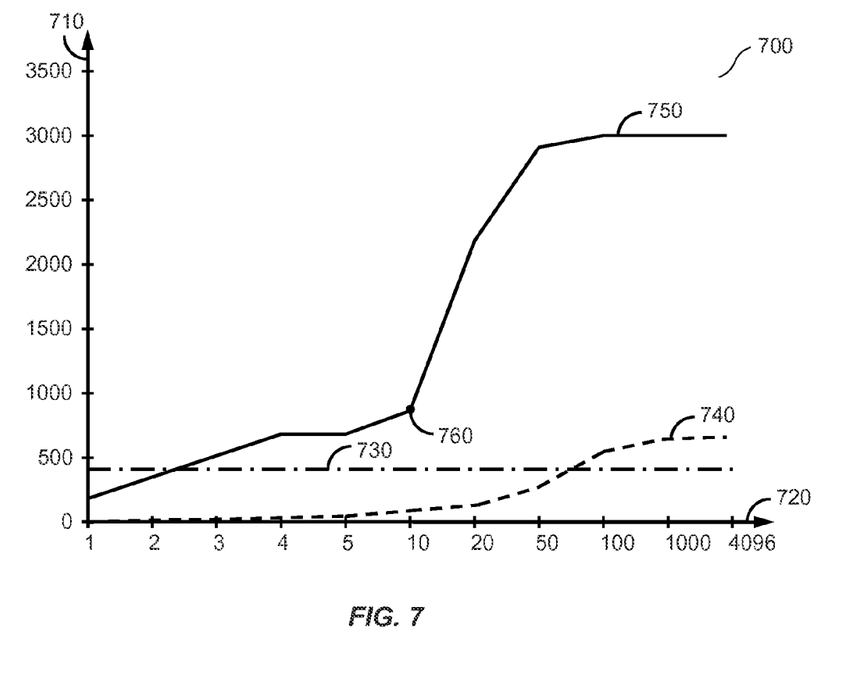
FIG. 7 depicts a simplified exemplary plot of bandwidth versus size of data transfer because of using embodiments of the present invention.

FIG. 7 depicts a simplified exemplary plot of bandwidth versus size of data transfer because of using embodiments of the present invention and compares results obtained using different write modes on a PC with 2.90 GHz Intel Xeon E5-2690 processors for CPU. Plot 700 includes a vertical axis 710 depicting the bandwidth of data transfer in Mb/sec and a horizontal axis 720 depicting 32-bit word packet size of data transfer sent. Plot 700 further includes a dot-dashed data line 730, a dashed data line 740, and a solid data line 750 corresponding respectively to bus mode plus UnCacheable or normal mode writing, DMA mode only for comparison, and bus mode plus WriteCombine or burst mode writing.

The bandwidth for bus mode plus UnCacheable or normal mode writing is constant versus data packet size as expected since each useful word is accompanied by its own address independent of how many words are sent. DMA mode shows significantly slower access than bus mode plus UnCacheable mode because of initialization latency for packet size below about 75 words to be sent in a packet. Bus mode plus WriteCombine or burst mode writing shows significantly better bandwidth than DMA mode or bus mode plus UnCacheable mode especially for larger packet size. In this example, measured bus mode plus WriteCombine or burst mode writing performs at about 4 times higher bandwidth than DMA mode writing at a packet size of 4096.

The measured bus mode plus WriteCombine or burst mode writing characteristic may include an inflection point 760 above which transferring the data using burst mode provides a steeper slope than below the inflection point on the plot of bandwidth versus packet size. In one embodiment, threshold T may be selected at the value of packet size corresponding to inflection point 760, which in this example corresponds to about 10 words. It is understood the bandwidth may be equipment dependent and empirical measurements may be used to select the value of threshold T.

The measured statistics were obtained through local bus instrumentation (after the PCIe bus) to measure, for each clock cycle of the bus, if the bus is free (idle), if an address (addr) or if a data (data) is transferred on the bus providing a good picture of PCIe bus transfer performance. Table 1 below shows measured PCIe bus transfer performance for 4096 word packet writing using bus mode plus UnCacheable mode. Note the average burst length of 1 word and the low bandwidth ratio on the PCIe bus.

TABLE 1

| 426.7 Mb/s | | | |
|---|---|---|---|
| master accesses: | slave accesses: | | |
| N/A | idle: | addr: | data: |
| none | 771,504,160 | 140,300,290 | 140,300,290 |
| none | bandwidth ratio 13.34% | | |
| none | average burst length 1 word | | |

Table 2 below shows measured PCIe bus transfer performance for 4096 word packet writing using DMA mode. Note the average length of the burst is 15 words but only a 20% bandwidth ratio on the PCIe bus due to initialization latency and flag transfer completion polling.

TABLE 2

| 647.9 Mb/s | | | |
|---|---|---|---|
| master accesses: | slave accesses: | | |
| N/A | idle: | addr: | data: |
| none | 844,667,390 | 13,618,690 | 217,899,010 |
| none | bandwidth ratio 20.25% | | |
| none | average burst length 15 words | | |

Table 3 below shows measured PCIe bus transfer performance for 4096 word packet writing using bus mode plus WriteCombine or burst mode. Note the average length of the burst of 15 words and the high bandwidth ratio on the PCIe bus (near 95%), which is difficult to improve upon.

TABLE 3

| 3 Gb/s | | | |
|---|---|---|---|
| master accesses: | slave accesses: | | |
| N/A | idle: | addr: | data: |
| none | 2,053,690 | 63,255,902 | 1,011,224,578 |
| none | bandwidth ratio 93.93% | | |
| none | average burst length 15 words | | |

In a circuit emulation environment, bus mode plus WriteCombine or burst mode may be found useful as soon as several words are to be written to successive addresses such as during memory loadings, sending messages to transactional ports, FPGA configurations, and/or table initializations. Bus mode plus UnCacheable mode or normal mode may be used for single register initializations.

Figure 8:
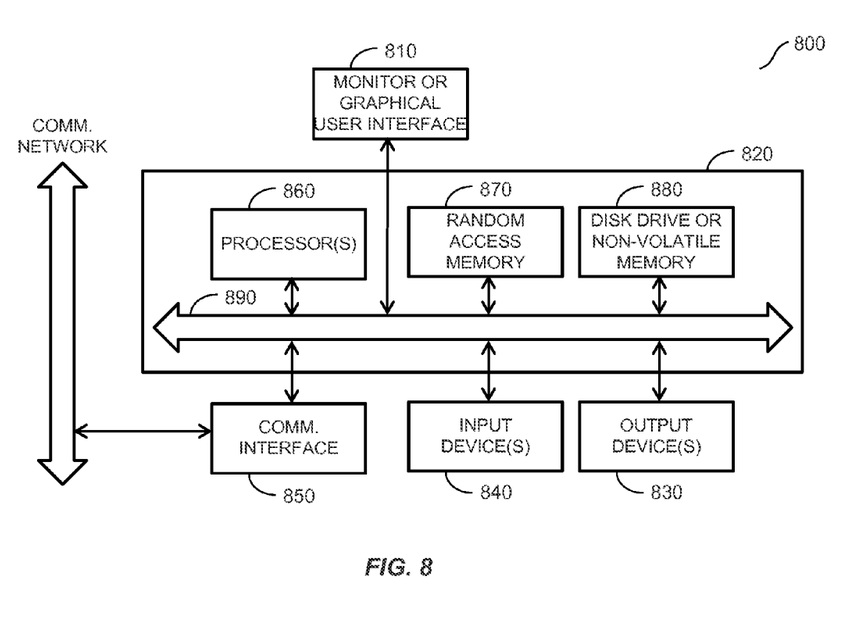
FIG. 8 is a block diagram of a computer system that may incorporate embodiments of the present invention.

FIG. 8 is a block diagram of a computer system that may incorporate embodiments of the present invention. FIG. 8 is merely illustrative of an embodiment incorporating the present invention and does not limit the scope of the invention as recited in the claims. One of ordinary skill in the art would recognize other variations, modifications, and alternatives.

In one embodiment, computer system 800 typically includes a monitor 810, a computer 820, user output devices 830, user input devices 840, communications interface 850, and the like.

As shown in FIG. 8, computer 820 may include a processor(s) 860 that communicates with a number of peripheral devices via a bus subsystem 890. These peripheral devices may include user output devices 830, user input devices 840, communications interface 850, and a storage subsystem, such as random access memory (RAM) 870 and disk drive 880.

User input devices 830 include all possible types of devices and mechanisms for inputting information to computer system 820. These may include a keyboard, a keypad, a touch screen incorporated into the display, audio input devices such as voice recognition systems, microphones, and other types of input devices. In various embodiments, user input devices 830 are typically embodied as a computer mouse, a trackball, a track pad, a joystick, wireless remote, drawing tablet, voice command system, eye tracking system, and the like. User input devices 830 typically allow a user to select objects, icons, text and the like that appear on the monitor 810 via a command such as a click of a button or the like.

User output devices 840 include all possible types of devices and mechanisms for outputting information from computer 820. These may include a display (e.g., monitor 810), non-visual displays such as audio output devices, etc.

Communications interface 850 provides an interface to other communication networks and devices. Communications interface 850 may serve as an interface for receiving data from and transmitting data to other systems. Embodiments of communications interface 850 typically include an Ethernet card, a modem (telephone, satellite, cable, ISDN), (asynchronous) digital subscriber line (DSL) unit, FireWire interface, USB interface, and the like. For example, communications interface 850 may be coupled to a computer network, to a FireWire bus, or the like. In other embodiments, communications interfaces 850 may be physically integrated on the motherboard of computer 820, and may be a software program, such as soft DSL, or the like.

In various embodiments, computer system 800 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiment, computer 820 includes one or more Xeon microprocessors from Intel as processor(s) 860. Further, one embodiment, computer 820 includes a UNIX-based operating system.

RAM 870 and disk drive 880 are examples of tangible media configured to store data such as embodiments of the present invention, including executable computer code, human readable code, or the like. Other types of tangible media include floppy disks, removable hard disks, optical storage media such as CD-ROMS, DVDs and bar codes, semiconductor memories such as flash memories, non-transitory read-only-memories (ROMS), battery-backed volatile memories, networked storage devices, and the like. RAM 870 and disk drive 880 may be configured to store the basic programming and data constructs that provide the functionality of the present invention.

Software code modules and instructions that provide the functionality of the present invention may be stored in RAM 870 and disk drive 880. These software modules may be executed by processor(s) 860. RAM 870 and disk drive 880 may also provide a repository for storing data used in accordance with the present invention.

RAM 870 and disk drive 880 may include a number of memories including a main random access memory (RAM) for storage of instructions and data during program execution and a read only memory (ROM) in which fixed non-transitory instructions are stored. RAM 870 and disk drive 880 may include a file storage subsystem providing persistent (non-volatile) storage for program and data files. RAM 870 and disk drive 880 may also include removable storage systems, such as removable flash memory.

Bus subsystem 890 provides a mechanism for letting the various components and subsystems of computer 820 communicate with each other as intended. Although bus subsystem 890 is shown schematically as a single bus, alternative embodiments of the bus subsystem may utilize multiple busses.

FIG. 8 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other microprocessors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Various embodiments of the present invention can be implemented in the form of logic in software or hardware or a combination of both. The logic may be stored in a computer readable or machine-readable non-transitory storage medium as a set of instructions adapted to direct a processor of a computer system to perform a set of steps disclosed in embodiments of the present invention. The logic may form part of a computer program product adapted to direct an information-processing device to perform a set of steps disclosed in embodiments of the present invention. Based on the disclosure and teachings provided herein, a person of ordinary skill in the art will appreciate other ways and/or methods to implement the present invention.

The data structures and code described herein may be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described herein include, but are not limited to, application-specific integrated circuits (ASICs), field-programmable gate arrays (FPGAs), dedicated or shared processors, and/or other hardware modules or apparatuses now known or later developed.

The methods and processes described herein may be partially or fully embodied as code and/or data stored in a non-transitory computer-readable storage medium or device, so that when a computer system reads and executes the code and/or data, the computer system performs the associated methods and processes. The methods and processes may also be partially or fully embodied in hardware modules or apparatuses, so that when the hardware modules or apparatuses are activated, they perform the associated methods and processes. The methods and processes disclosed herein may be embodied using a combination of code, data, and hardware modules or apparatuses.

The above embodiments of the present invention are illustrative and not limiting. Various alternatives and equivalents are possible. Although, the invention has been described with reference to a PCIe standard bus by way of an example, it is understood that the invention is not limited by the type of bus standard but may also be applicable to other types of bus standards. Although, the invention has been described with reference to a 32-bit wide bus by way of an example, it is understood that the invention is not limited by the width of the bus but may also be applicable to other bus widths. Although, the invention has been described with reference to a LINUX operating system by way of an example, it is understood that the invention is not limited by the type of operating system but may also be applicable to other types of operating systems. Although, the invention has been described with reference to commands associated with a processor by Intel by way of an example, it is understood that the invention is not limited by the type of commands or processor manufacturers but may also be applicable to other types of commands or processor manufacturers. Although, the invention has been described with reference to an emulator device by way of an example, it is understood that the invention is not limited by the type of electronic device receiving transferred data over the bus but may also be applicable to other types of devices. In addition, the technique and system of the present invention is suitable for use with a wide variety of electronic design automation (EDA) tools and methodologies for designing, testing, and/or manufacturing systems characterized by benefitting from faster data transfer over a bus. The scope of the invention should, therefore, be determined not with reference to the above description, but instead should be determined with reference to the pending claims along with their full scope or equivalents.

What is claimed is:

1. A computer-implemented method for transferring data over a bus from a host to a device, the method comprising:
   determining a size of the data to be transferred;
   transferring the data using normal mode when the size is below a threshold;
   transferring the data using burst mode when the size is equal to or larger than the threshold;
   transferring the data to a first address space when the size is below the threshold; and
   transferring the data to a second address space different from the first address space when the size is equal to or larger than the threshold.

2. The computer-implemented method of claim 1, wherein the bus is a peripheral component interconnect express (PCIe) bus.

3. The computer-implemented method of claim 1, wherein transferring the data using burst mode does not use a direct memory access (DMA)-able memory.

4. The computer-implemented method of claim 1, wherein transferring the data to the first address space uses a first address pointer and transferring the data to the second address space uses a second address pointer different from the first address pointer.

5. The computer-implemented method of claim 1, wherein the device is a circuit emulator.

6. The computer-implemented method of claim 5, wherein the circuit emulator includes at least one field programmable gate array (FPGA).

7. The computer-implemented method of claim 1, wherein the data includes one or more words, each word including a plurality of data bits capable of being concurrently transferred on the bus.

8. The computer-implemented method of claim 7, wherein the size is a value corresponding to the number of the one or more words being transferred.

9. The computer-implemented method of claim 7, wherein transferring the data using normal mode includes transferring one or more addresses each associated with a different one of the one or more words forming one or more address/data pairs, the one or more address/data pairs being sequentially transmitted.

10. The computer-implemented method of claim 9, wherein the first address space and the second address space are included in an address space of the device.

11. The computer-implemented method of claim 7, wherein the threshold is selected at a value of size corresponding to an inflection point above which transferring the data using burst mode provides a steeper slope than below the inflection point on a plot of bandwidth versus size.

12. The computer-implemented method of claim 7, wherein transferring the data using burst mode includes transferring a first address associated with a plurality of words and sequentially transferring the plurality of words.

13. The computer-implemented method of claim 12, wherein transferring the data using burst mode includes transferring a second address different from an address expected for the next sequential address after sequentially transferring the plurality of words to signify an end of transferring the data using burst mode.

14. A non-transitory computer-readable storage medium comprising instructions which when executed by a computer cause the computer to:
   determine a size of the data to be transferred;
   transfer the data using normal mode when the size is below a threshold;
   transfer the data using burst mode when the size is equal to or larger than the threshold;
   transfer the data to a first address space when the size is below the threshold; and
   transfer the data to a second address space different from the first address space when the size is equal to or larger than the threshold.

15. A system for transferring data over a bus from a host to a device configured to:
   determine a size of the data to be transferred;
   transfer the data using normal mode when the size is below a threshold;
   transfer the data using burst mode when the size is equal to or larger than the threshold;
   transfer the data to a first address space when the size is below the threshold; and
   transfer the data to a second address space different from the first address space when the size is equal to or larger than the threshold.

* * * * *